Patented Mar. 30, 1948

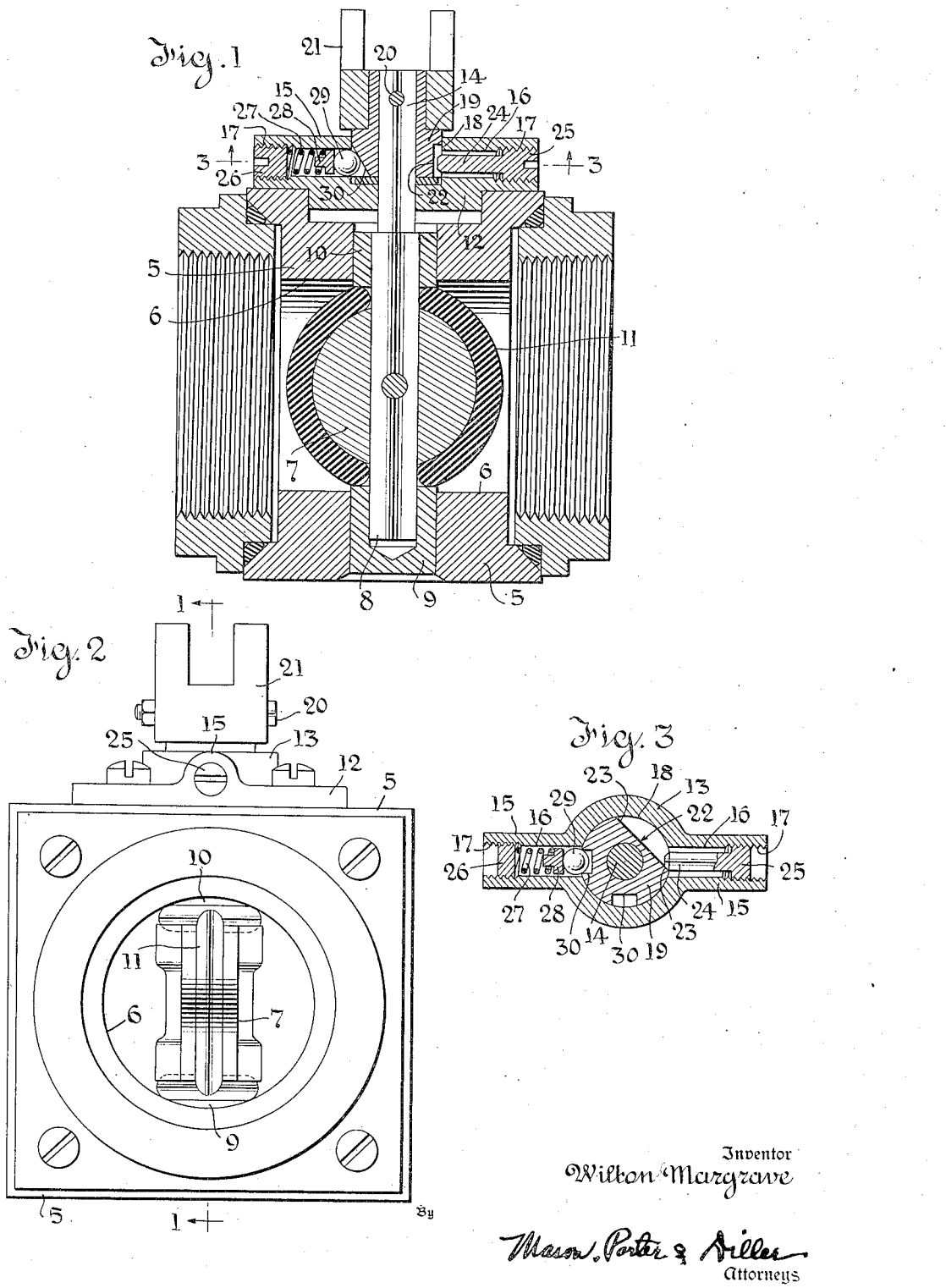

2,438,672

UNITED STATES PATENT OFFICE 2,438,672

VALVE INDEXING MEANS

Wilton Margrave, Cleveland, Ohio, assignor to The Parker Appliance Company, Cleveland, Ohio, a corporation of Ohio Application September 5, 1944, Serial No. 552,775

3 Claims. (Cl. 74—527)

The invention relates generally to valve structures wherein are provided a flow passage and a rotor turnable to open or close said passage, or a multiple of inlet and discharge ports and a rotor having a passage or passages therethrough and turnable to selected positions for bringing selected ports into registry for properly controlling flow of fluid through the valve structure, and it primarily seeks to provide certain new and useful improvements in indexing means for determining the selective positioning of such rotors.

More specifically, the invention seeks to provide in a valve structure in which the rotor is turned back and forth a definite distance, say for example a quarter turn, in effecting a proper selection of inlet or discharge ports, or an opening and closing of the valve, novel rotor position determining indexing means comprising a rotor element attached to or forming a part of the valve rotor, a stationary part attached to or forming a part of the valve casing and having a bore therethrough intersecting the axis of said rotor element and internally threaded outwardly of its intersection with said element, a stop screw mounted in one end of the bore and projected inwardly for engagement with said element, and a spring detent mounted in the other end of the bore and projecting inwardly for engagement with said element, said element having a recess in one side thereof to receive the screw projection and having its ends disposed to engage the screw when the valve rotor is turned to one or the other of two turning movement limits to definitely place the valve rotor, and said element having two recesses in its other side in which to selectively receive the spring detent and disposed cooperatively with relation to the recess ends to yieldably hold the valve rotor in one or the other of said turning movement limits.

With the above and other objects in view that will hereinafter appear, the nature of the invention will be more clearly understood by reference to the following detailed description, the appended claims, and the several views illustrated in the accompanying drawing.

In the drawing:

Figure 1 is a vertical longitudinal sectional view illustrating a valve structure embodying the invention, the section being taken on the line 1—1 on Figure 2.

Figure 2 is an end elevation of the valve structure shown in Figure 1.

Figure 3 is a horizontal section taken on the line 3—3 on Figure 1.

In the example of embodiment herein disclosed, the improved indexing means forming the subject matter of the invention is shown as incorporated in a simple valve structure of the butterfly type wherein is provided a casing 5 having a flow passage 6 therethrough controlled by a butterfly valve rotor disk 7. The disk 7 is secured on a stem 8 which is rotatable at its lower end in a bearing cup 9, and at its upper end the stem passes through a bearing sleeve 10. Sealing gasket means 11 surrounds the disk 7 in position for effecting a seal when the disk is turned a quarter-turn from the open position illustrated in Figures 1 and 2 to a closed position across the casing flow passage 6.

A cap 12 is removably secured on the casing and includes an upstanding boss 13 through which the upward stem extension 14 passes. The cap also is equipped with a cross rib 15 having a bore 16 therethrough disposed to intersect the axis of the stem and rotor. It will be apparent by reference to Figures 1 and 3 that the rib 15 and its bore 16 comprise two radially extended portions, each extending to one side of the valve stem. Each radially extended portion of the bore 16 is internally threaded at its outer end as at 17, and the cap 12 is provided with a counterbore 18, and within the counterbore a rotor element 19 is pin-secured as at 20 on the valve stem extension 14 so as to be rotatable with the valve rotor or disk 7 between the radially extended portions of the rib bore 16. A yoke 21 or other turning device is secured to the rotor element 19 and stem extension 14 in the manner clearly illustrated in Figures 1 and 2.

One side face of the rotor element 19 is cut away as at 22 to form a recess or clearance having end stop portions 23 disposed to engage the end 24 of a stop screw 25 which is threadably mounted in one of the radially extended portions of the rib bore 16. It will be apparent by reference to Figures 1 and 3 of the drawing that the clearance or recess stop portions 23 are so disposed with relation to the inner end of the pin 24 extending into the counterbore 18 that said stop portions and the screw end will serve to definitely stop movement of the valve rotor or disk 7 after it has been turned 90° in either direction, thereby to definitely place said rotor in the fully open position or in the fully closed position. In the other radially extended portion of the rib bore 16, there is mounted a screw plug 26 which backs up a compression spring 27 engaged at its other end with a follower 28 which in turn engages a detent ball 29. The spring pressed ball or detent 29 is engageable with one or the other of two recesses 30 formed in the side wall of the rotor element 19, and the recesses 30 are positioned in cooperative relation to the stop portions 23 of the recess or clearance 22 so as to receive the ball 29 as one or the other of the stop portions 23 engages in rotor stopping relation with the screw 24. Thus the cooperation of the spring pressed ball or detent 29 with the recess 30 serves to yieldably hold the disk or rotor 7 in the open position or in the closed position.

While the improved indexing means is herein disclosed as incorporated in a valve of the butterfly type in which the rotor is turned 90° to either open or close the valve, it is to be understood that this indexing means can be incorporated in other forms of valves in which the rotor includes a flow passage, or passages, intended to be brought into registry with selected casing ports for selective distribution of fluid through the valve. See for example, the application for U. S. Letters Patent filed by Hartley on April 12, 1944, identified by Serial No. 530,619. Thus it will be apparent that the spaced relation of the stop portions 23 of the rotor element clearance or recess 22, and also the spaced relation of the spring detent or ball receiving recesses 30 can be changed according to the relation of the ports or passages to be selected without departing from the scope of the invention as defined in the appended claims.

I claim:

1. Indexing means for a valve structure wherein are provided a casing and a rotor turnable back and forth to and between two selective positions, said indexing means comprising a rotor portion movable with the rotor, a part fixed on the casing and having a bore therethrough intersecting the axis of the rotor, a stop screw mounted in one end of the bore and projecting radially inwardly for engagement with said rotor portion, and a spring detent mounted in the other end of the bore and projecting radially inwardly for engagement with said rotor portion, said rotor portion having a recess in the side thereof presented toward said screw with the ends of the recess disposed to engage as stop means with the screw when the rotor is turned to one or the other of said selective positions, and said rotor portion also having two recesses in its periphery at its other side in which to selectively receive the spring detent and disposed cooperatively with relation to the recess ends to yieldably hold the rotor in one or the other of said selective positions.

2. Indexing means for a valve structure wherein are provided a casing and a rotor turnable back and forth to and between two selective positions, said indexing means comprising a rotor portion movable with the rotor, a part fixed on the casing and having a first bore portion extending radially with respect to the axis of the rotor and a second bore portion extending radially with respect to said rotor axis, a stop screw mounted in said first bore portion and projecting radially inwardly for engagement with said rotor portion, and a spring detent mounted in said second bore portion and projecting radially inwardly for engagement with said rotor portion, said rotor portion having a recess in the side thereof presented toward said screw with the ends of the recess disposed to engage as stop means with the screw when the rotor is turned to one or the other of said selective positions, and said rotor portion also having two recesses in its periphery at another side portion thereof in which to selectively receive the spring detent and disposed cooperatively with relation to the recess ends to yieldably hold the rotor in one or the other of said selective positions.

3. A detent structure as defined in claim 2 in which the stop screw is adjustably mounted in the first bore portion so as to permit projection of the stop end of the screw a greater or lesser distance toward the axis of the rotor, and in which the rotor portion recess presented for contact as stop means cooperating with said screw comprises a mere flattening of the side face of the rotor portion opposite said screw.

WILTON MARGRAVE.

REFERENCES CITED

The following references are of record in the file of this patent:

UNITED STATES PATENTS

| Number | Name | Date |
| --- | --- | --- |
| 651,706 | Forbes | June 12, 1900 |
| 700,009 | Bean | May 13, 1902 |
| 865,486 | Gannon | Sept. 10, 1907 |
| 1,498,171 | Kaps | June 17, 1924 |
| 1,578,383 | Bayles | Mar. 30, 1926 |
| 1,622,159 | Linden et al. | Mar. 22, 1927 |
| 1,670,691 | Riggin | May 22, 1928 |
| 2,060,256 | Smith | Nov. 10, 1936 |
| 2,108,299 | Steffen | Feb. 15, 1938 |
| 2,109,451 | Loomis et al. | Mar. 1, 1938 |
| 2,161,070 | McDonough | June 6, 1939 |
| 2,350,441 | Anderson | June 6, 1944 |

FOREIGN PATENTS

| Number | Country | Date |
| --- | --- | --- |
| 329,240 | Great Britain | May 15, 1930 |